United States Patent
Koizumi

(10) Patent No.: US 6,504,868 B1
(45) Date of Patent: Jan. 7, 2003

(54) ADAPTIVE EQUALIZER

(75) Inventor: Fumiaki Koizumi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/266,607

(22) Filed: Mar. 11, 1999

(30) Foreign Application Priority Data

Mar. 13, 1998 (JP) .......................................... 10-063170

(51) Int. Cl.⁷ ............................ H03H 7/30; H03H 7/40; H03K 5/159

(52) U.S. Cl. ...................... 375/232; 375/262; 375/341; 375/231

(58) Field of Search ................................ 375/232, 262, 375/265, 341, 340, 285, 229, 230, 231, 233; 714/795

(56) References Cited

U.S. PATENT DOCUMENTS

| | | | | |
|---|---|---|---|---|
| 4,361,892 A | * | 11/1982 | Martin | 375/232 |
| 5,050,186 A | * | 9/1991 | Gurcan et al. | 375/233 |
| 5,818,876 A | * | 10/1998 | Love | 375/341 |
| 5,867,531 A | * | 2/1999 | Shiino et al. | 375/262 |
| 6,215,818 B1 | * | 4/2001 | Velez et al. | 375/233 |

FOREIGN PATENT DOCUMENTS

| | | |
|---|---|---|
| JP | 56-17512 | 2/1981 |
| JP | 59-22430 | 2/1984 |
| JP | 63-228817 | 9/1988 |
| JP | 64-62033 | 3/1989 |
| JP | 01-194614 | 8/1989 |
| JP | 5-3437 | 1/1993 |
| JP | 05-63605 | 3/1993 |
| JP | 05-110617 | 4/1993 |
| JP | 5-110617 | 4/1993 |
| JP | 05-175783 | 7/1993 |
| JP | 05-304444 | 11/1993 |
| JP | 5-316083 | 11/1993 |
| JP | 05-316083 | 11/1993 |
| JP | 05-343948 | 12/1993 |
| JP | 07-176991 | 7/1995 |
| JP | 07-261772 | 10/1995 |
| JP | 08-32491 | 2/1996 |
| JP | 08-125587 | 5/1996 |
| WO | WO94/18752 A1 | 8/1994 |

OTHER PUBLICATIONS

J. Wu et al., "A New Adaptive Equalizer with Channel Estimator for Mobile Radio Communications", *IEEE Transactions on Vehicular Technology*, vol. 45, No. 3, Aug. 1996, pp. 467–474.

G.C. Chui et al., "Variable Step Adaptive Equalizer for Digital Mobile Radio", *Singapore ICCS '94. Conference Proceedings.*, Nov. 1994, pp. 119–123.

* cited by examiner

Primary Examiner—Phuong Phu
(74) Attorney, Agent, or Firm—Sughrue Mion, PLLC

(57) ABSTRACT

Since a conventional adaptive equalizer handles an update quantity control parameter $\mu$ as a fixed value, the update quantity control parameter $\mu$ is not optimized adaptively to variation of a channel state and the BER characteristic is deteriorated. Thereupon, the invention controls a parameter $\mu$ for controlling the update quantity of updating the impulse response of a channel by the adaptive algorithm operating portion 2 according to an estimated BER value, by performing a BER estimating process by the BER estimating portion 4 and performing an update quantity control parameter adjusting process by the update quantity control parameter adjusting portion 5, and increases the parameter $\mu$ so that it follows variation of a channel state in an environment where the channel state is bad and severely varies and decreases the parameter $\mu$ in a good environment where the channel state varies little, and thereby reduces deterioration in BER characteristic which could have been caused by a fact that the value of $\mu$ is not optimized adaptively to variation of a channel state.

6 Claims, 8 Drawing Sheets

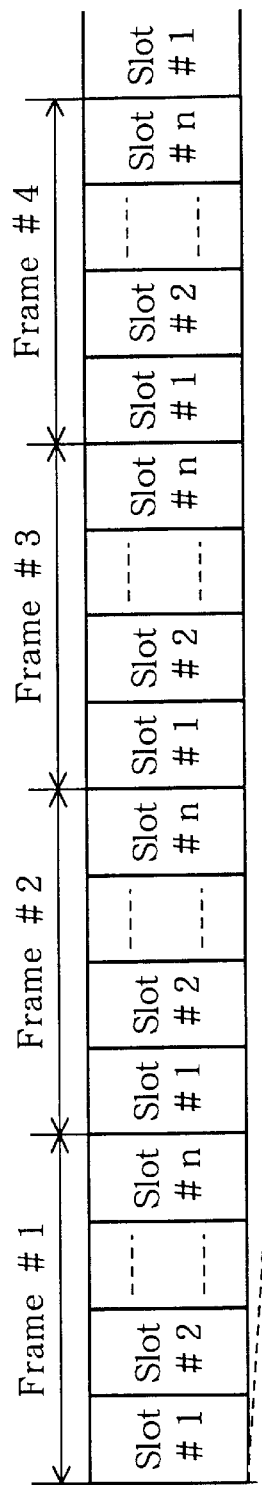
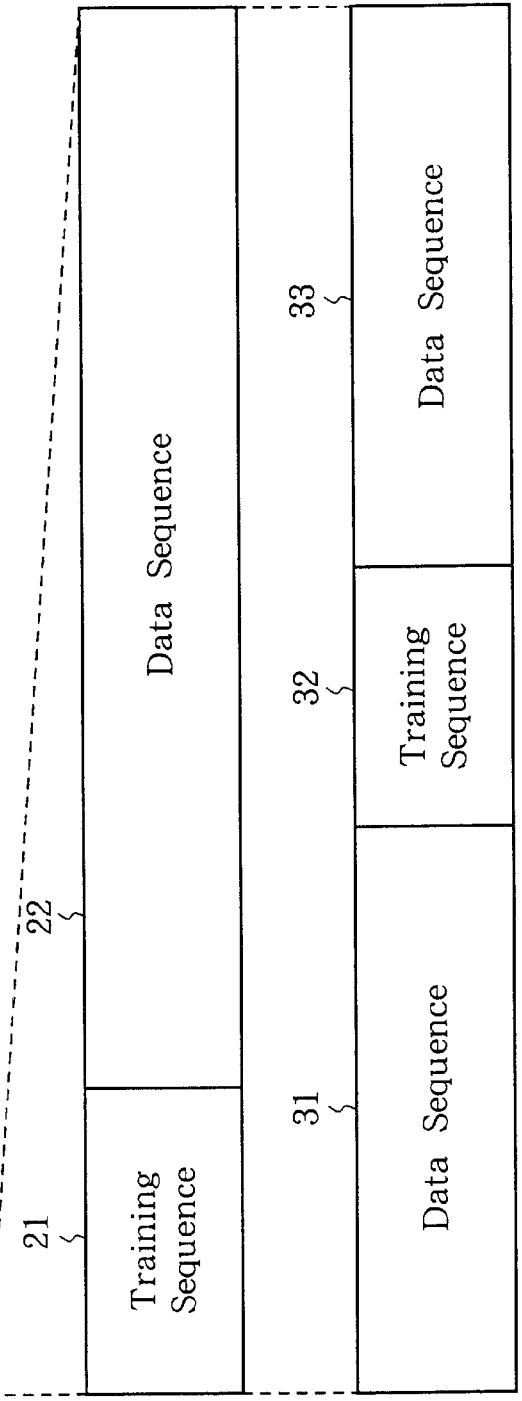
FIG.7A
FIG.7B
FIG.7C

ADAPTIVE EQUALIZER

CROSS REFERENCE TO RELATED APPLICATIONS

The present invention claims priority from Japanese Patent Application No. 10-063170 filed Mar. 13, 1999, the contents of which are incorporated herein by reference.

BACKGROUND OF THE INVENTION

1. Field of the Invention

The present invention relates to an adaptive equalizer, and more particularly to an adaptive equalizer for equalizing a received signal in order to reduce interference between codes.

2. Description of Related Art

Up to now, in a digital communication system such as a mobile radio communication system and the like, a technique of adaptively equalizing a received signal with an adaptive equalizer in order to compensate for degradation in performance of a transmission channel due to interference between codes has been known (Japanese Patent Application Laid-open No. 5-3437, No. 5-316083, No. 5-110617, and the like).

FIG. 9 shows a block diagram of an example of a portable telephone provided with an adaptive equalizer. In FIG. 9, a received signal received by a radio receiving portion 41 is converted into a digital signal by an analog-to-digital (AD) converter 42 and then is supplied to an adaptive equalizer 43 and is applied here with an adaptive equalizing process to be an equalized data signal. An equalized data signal outputted from the adaptive equalizer 43 is supplied to an error correction decoder 44, and is here error-corrected and decoded and then taken out.

FIG. 10 shows a block diagram of an example of a conventional adaptive equalizer used as the above-mentioned adaptive equalizer 43. In FIG. 10, a received signal is inputted into a channel estimating portion 1, an adaptive algorithm operating portion 10, and a Viterbi decoder 3. The channel estimating portion 1 estimates a channel state from an inputted reception signal to find an impulse response of the channel. The adaptive algorithm operating portion 10 updates an impulse response with an adaptive algorithm on the basis of the received signal and the impulse response of the channel estimated by the channel estimating portion 1.

The adaptive algorithm is an algorithm for updating every moment the impulse response of a channel in order to bring the impulse response as close as possible to an actual channel state. What the update is performed on the basis of is entrusted to a reference literature describing in detail adaptive algorithms ("Waveform Equalizing Techniques for Mobile Digital Communication", pp. 33 issued by TORIKKEPS), but this is simply described as follows.

A result obtained by multiplying an impulse response used in an adaptive equalizing process by a result of the adaptive equalizing process is compared with the received signal. If the impulse response has been correctly estimated, both of them must be equal to each other. A difference between both of them is detected as an error, and this is fed back for updating the impulse response. It is assumed that a parameter to control the update quantity of an impulse response to be updated is referred to as an update quantity control parameter $\mu$. An error which is equal in quantity to but larger in $\mu$ than another error has a larger update quantity in impulse response, while an error which is equal in quantity to but smaller in $\mu$ than another error has a smaller update quantity in impulse response.

The Viterbi decoder 3 equalizes a received signal by performing a Viterbi decoding process based on the received signal and the impulse response of a channel updated by the adaptive algorithm operating portion 10. The equalized data signal obtained by this Viterbi decoder 3 is outputted to the latter stage and simultaneously is fed back to the adaptive algorithm operating portion 10. Thus, the received signal is taken out as an equalized data signal applied with an adaptive equalizing process.

However, since the above-mentioned conventional adaptive equalizer handles as a fixed value an update quantity control parameter $\mu$ for controlling the update quantity of an impulse response to be used in updating a result of estimating a channel state according to an adaptive algorithm, the update quantity control parameter $\mu$ is not optimized adaptively to variation of the channel state, and this causes deterioration in BER (bit error rate) performance.

SUMMARY OF THE INVENTION

The present invention has been performed in consideration of the above-mentioned point, and has an object of providing an adaptive equalizer capable of reducing deterioration in BER performance by optimizing an update quantity control parameter $\mu$ for controlling the update quantity of an impulse response adaptively to variation of a channel state.

In order to attain the above-mentioned object, the present invention provides an adaptive equalizer comprising; a channel estimating means for having a received signal inputted and estimating the impulse response of a channel of the received signal, an adaptive algorithm operating means for adaptively updating the impulse response of the channel estimated by the channel estimating means according to an update quantity control parameter on the basis of an adaptive algorithm, a decoding means for performing a Viterbi decoding process based on the received signal and the impulse response obtained the adaptive algorithm means and outputting an equalized data signal of the received signal, a bit error rate estimating means for estimating a bit error rate of the equalized data signal taken out from the decoding means, and an update quantity control parameter adjusting means for adjusting and supplying an update quantity control parameter on the basis of an estimated bit error rate value calculated by the bit error rate estimating means to the adaptive algorithm operating means.

Since the present invention adjusts and supplies an update quantity control parameter on the basis of an estimated error rate value to an adaptive algorithm operating means, it can estimate a channel state on the basis of the estimated bit error rate value and optimize the value of an update quantity control parameter $\mu$ adaptively to variation of the channel state.

The present invention provides an adaptive equalizer as described above, further comprising an average power calculating means for calculating the average power of received signals, in which the update quantity control parameter adjusting means determines what class an average power calculated by the average power calculating means belongs to among plural predetermined classes and compares in magnitude a predetermined threshold value corresponding to a class determined by it and the estimated bit error rate value with each other, and updates an update quantity control parameter so that it increases or decreases according to a result of comparison obtained at this time.

Since the present invention determines what class the average power of a received signal belongs to among plural classes and compares in magnitude a predetermined threshold value corresponding to a class obtained by the determination with an estimated bit error rate value, and increases or decreases an update quantity control parameter according to a result of comparison obtained at this time, it can adjust an update quantity control parameter corresponding to the magnitude of an expected bit error rate varying with the strength of a reception electric field even in the same channel state.

Hereupon, the update quantity control parameter adjusting means is characterized by updating an update quantity control parameter so that it increases by one step width which has been initially set when an estimated bit error rate value calculated by the bit error rate estimating means is larger than a threshold value and updating an update quantity control parameter so that it decreases by one step width initially set when an estimated bit error rate value is equal to or smaller than a threshold value.

The bit error rate estimating means according to the present invention is characterized by taking out data corresponding to a training sequence out of equalized data taken out from the decoding means, comparing the data with a predetermined reference sequence, counting the number of bits in those data being different in value from each other, and determining a value obtained by dividing that number of different bits by the number of bits of the data corresponding to the training sequence as an estimated bit error rate value.

The update quantity control parameter adjusting means may limit the upper limit of a value obtained by updating an update quantity control parameter so that it increases to a predetermined maximum value, and may limit the lower limit of a value obtained by updating an update quantity control parameter so that it decreases to a predetermined minimum value.

BRIEF DESCRIPTION OF THE DRAWINGS

Embodiments of the present invention are described with reference to the following drawings.

FIGS. 7A, 7B and 7C show a signal format of a equalized data signal.

DETAILED DESCRIPTION OF THE PREFERRED EMBODIMENTS

Figure 1:
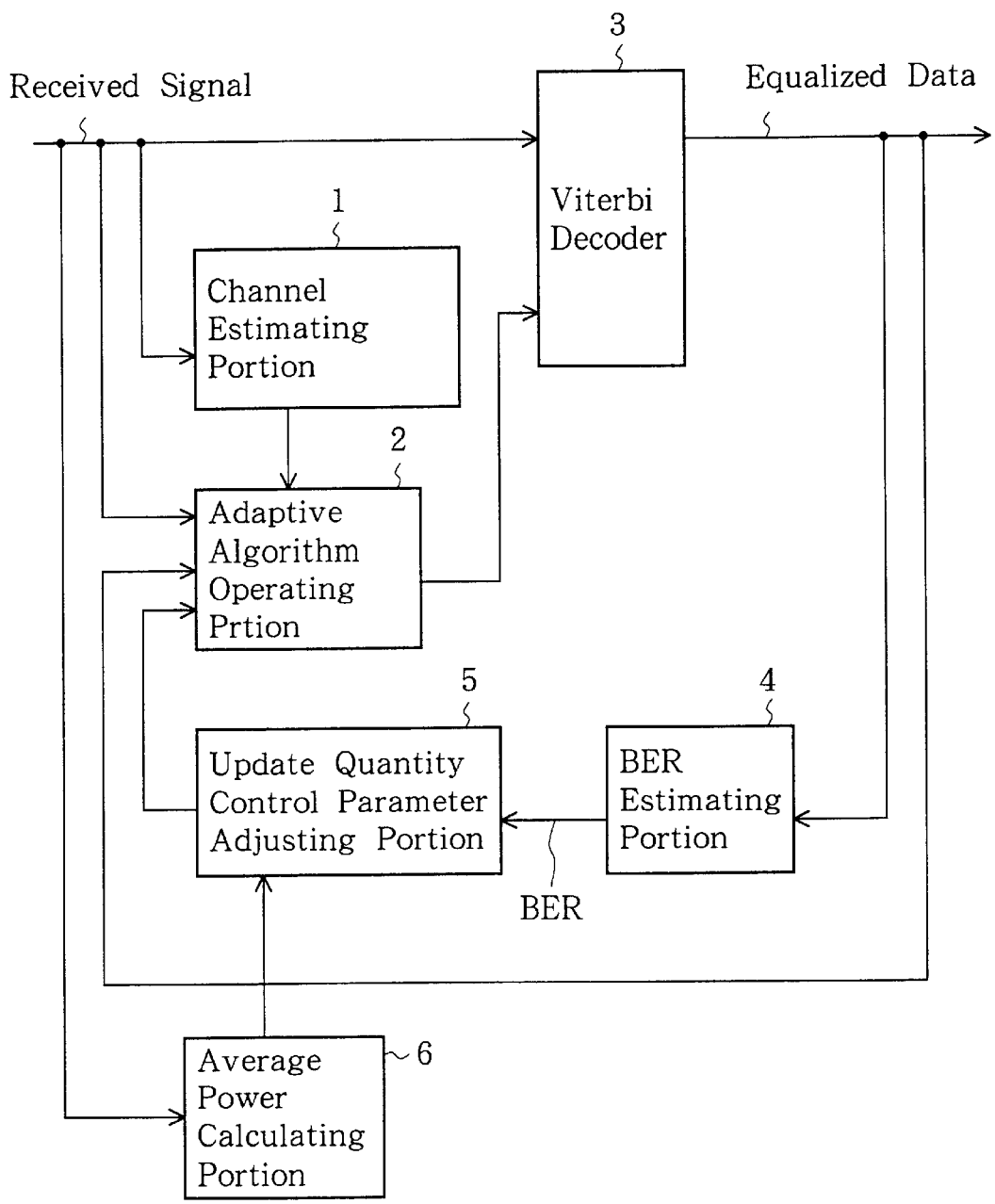
FIG. 1 is a block diagram showing an adaptive equalizer of an embodiment of the present invention.

FIG. 1 is a block diagram showing an embodiment of an adaptive equalizer according to the present invention. An adaptive equalizer of this embodiment is an example in which the present invention is applied to a portable telephone, and is composed of a channel estimating portion 1, an adaptive algorithm operating portion 2, a Viterbi decoder 3, a BER estimating portion 4, an update quantity control parameter adjusting portion 5, and an average power calculating portion 6.

A received signal is inputted into the channel estimating portion 1 and the Viterbi decoder 3. The channel estimating portion 1 estimates a channel state from the inputted reception signal to find the impulse response of a channel. The Viterbi decoder 3 equalizes the received signal by performing a Viterbi decoding process on the basis of the received signal and the impulse response of the channel from the adaptive algorithm operating portion 2 and outputs the equalized data signal. The adaptive algorithm operating portion 2 updates the impulse response estimated by the channel estimating portion 1 by means of an adaptive algorithm.

As described above, the adaptive algorithm 2 is an algorithm for updating every moment the impulse response of a channel in order to bring the impulse response as close as possible to an actual channel state. In the same way as a conventional technique, a result obtained by multiplying an impulse response used in an adaptive equalizing process by a result (an equalized data signal outputted from the Viterbi decoder 3) of the adaptive equalizing process is compared with the received signal. If the impulse response has been correctly estimated, both of them must be equal to each other. A difference between both of them is detected as an error, and the impulse response is updated according to an update quantity control parameter $\mu$.

Figure 5:
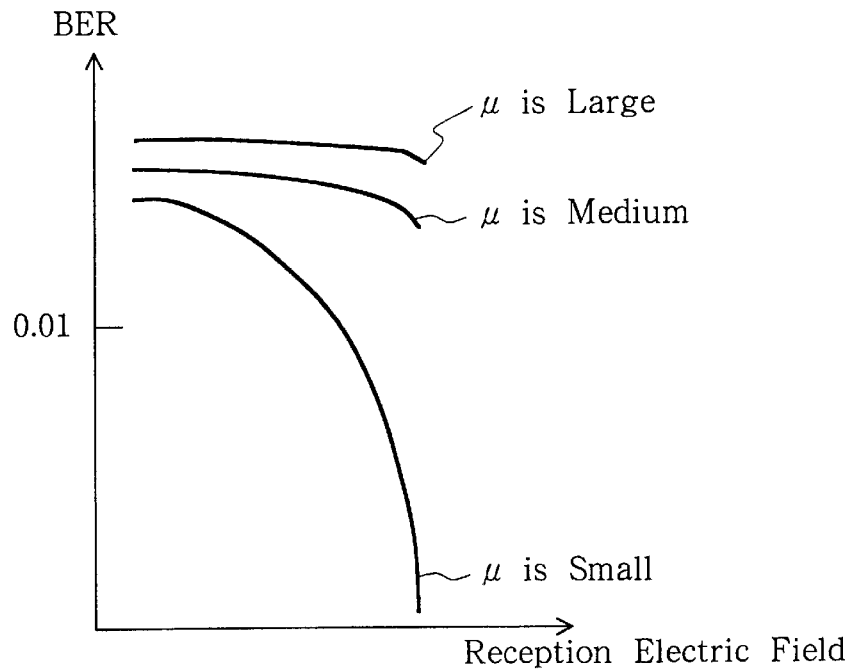
FIG. 5 shows a BER characteristic in a good channel state.
Figure 6:
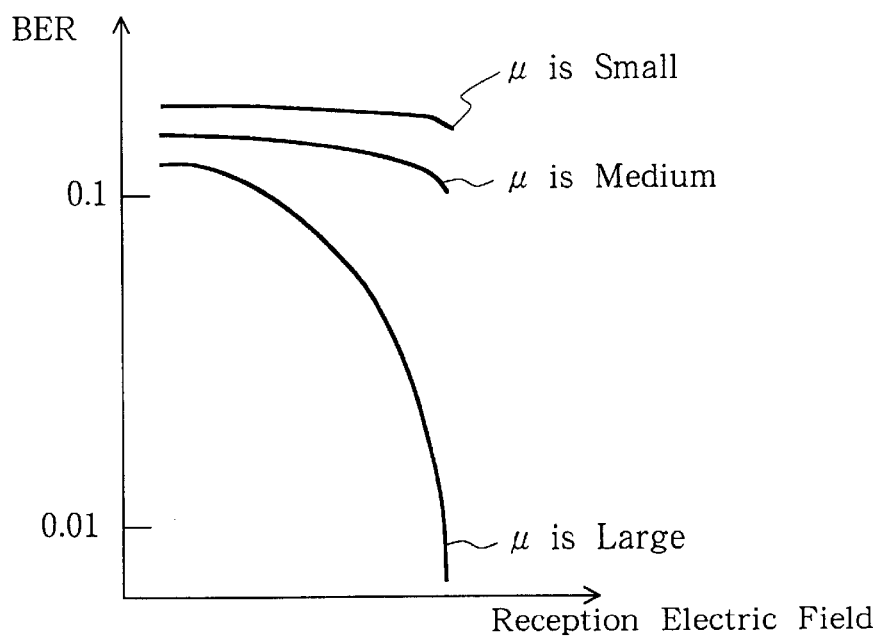
FIG. 6 shows a BER characteristic in a bad channel state (a multi-path fading environment).

FIG. 5 is a diagram showing qualitatively a BER characteristic taking an update quantity control parameter $\mu$ as a parameter in a good channel state. As known from the characteristic diagram of FIG. 5, in case of the same reception electric field strength, the smaller the update quantity control parameter $\mu$ is, the better the BER characteristic is. And FIG. 6 is a diagram showing qualitatively a BER characteristic taking an update quantity control parameter $\mu$ as a parameter in a bad channel state such as a multi-path fading environment. As known from the characteristic diagram of FIG. 6, in case of the same reception electric field strength, the smaller the update quantity control parameter $\mu$ is, the worse the BER characteristic is.

Ordinarily, therefore, the need of trade-off of selecting an update quantity control parameter $\mu$ to satisfy both of those characteristics to some degree results in occurring. This embodiment reduces deterioration in BER characteristic caused by variation of a channel state by controlling the value of an update quantity control parameter $\mu$ according to an estimated BER value.

The BER estimating portion 4 shown in FIG. 1 is a block for estimating a BER by detecting a training sequence contained in an equalized data signal and counting the number of errors in the training sequence. The update quantity control parameter adjusting portion 5 determines and outputs the optimum update quantity control parameter $\mu$ on the basis of the estimated BER value and the average power of received signals over one frame obtained by the average power calculating portion 6. A process performed inside this update quantity control parameter adjusting portion 5 is described in detail later.

Next, operation of the embodiment of the present invention is described with reference to the flowchart showing an adaptive equalizing process of FIG. 2. First, parameters to be initially set for controlling the value of an update quantity control parameter $\mu$ are set (step S1). It is assumed that the parameters to be initially set include the initial value $\mu 0$, one step width $\mu S$, the maximum value $\mu\mathrm{max}$ of an update quantity control parameter $\mu$, the minimum value $\mu\mathrm{min}$ of the update quantity control parameter $\mu$, the number of classes of average reception power and their threshold values, threshold values of BER corresponding to the classes of average reception power and the like, and all of them are invariable through the whole adaptive equalizing process.

Then, the channel estimating portion 1 estimates a channel state on the basis of an inputted reception signal to estimate the impulse response of a channel (step S2). An adaptive equalizing process is to be performed using this impulse response, but it is judged whether or not the current adaptive equalizing process is the first adaptive equalizing process since the power of a portable telephone adopting this embodiment was turned on (step S3). If it is the first process, since the value of the update quantity control parameter $\mu$ has not been set properly, the initial value $\mu 0$ is used in the adaptive equalizing process as an update quantity control parameter $\mu$ (step 5). And if it is the second or later process, since an update quantity control parameter $\mu$ has been set in the previous adaptive equalizing process, the value of that parameter is set so as to be used (step S4). The setting of it is described later.

Following this, an adaptive equalizing process is performed over one frame by the adaptive algorithm operating portion 2, using the update quantity control parameter $\mu$ set in step S4 or S5 (step S6). When the adaptive equalizing process for one frame is ended, the BER estimating portion 4 performs a BER estimating process (step S7), and then the update quantity control parameter adjusting portion 5 performs an update quantity control parameter adjusting process (step S8). Thus, when the adaptive equalizing process for one frame is ended (step S9), the system returns to step S2 and estimates a channel. In such a way as this, the system repeats a process from step S2 to step S8 for each frame.

Figure 3:
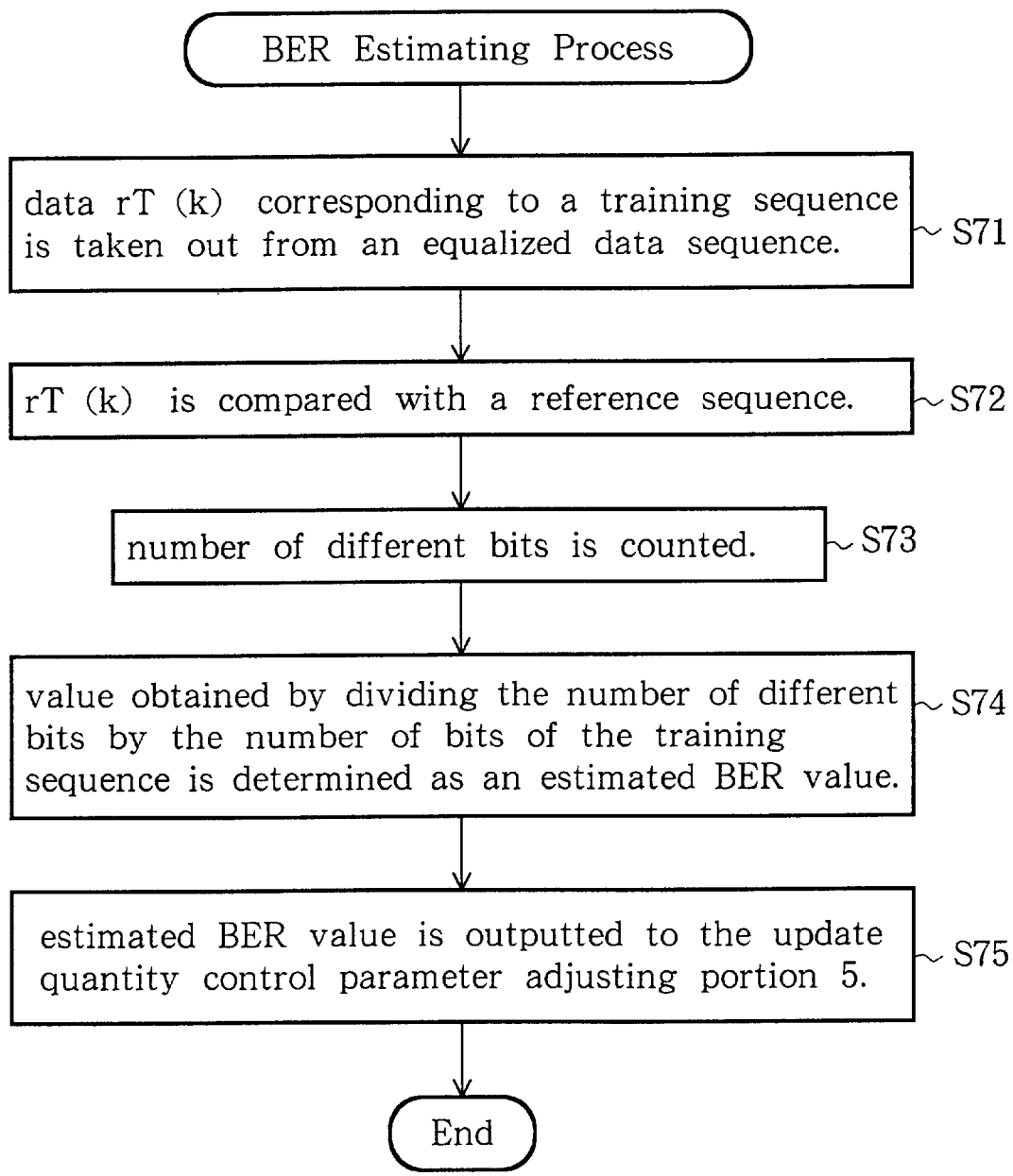
FIG. 3 is a flowchart for explaining operation of a BER estimating portion.

Next, the BER estimating process in step S7 is described in detail with reference to the flowchart of FIG. 3. The BER estimating portion 4 first takes out a data sequence rT(k) corresponding to a training sequence out of an equalized data signal from the Viterbi decoder 3 (step S71).

Hereupon, in the signal format of said equalized data signal, each frame is composed of n slots as shown in FIG. 7A and each of the slots has a structure composed of a data sequence 21 and a data sequence 22 following it as schematically shown in FIG. 7B or a structure in which a training sequence is multiplexed between data sequences 31 and 32. Since in each of these cases the position where the data sequence of a training sequence is multiplexed in equalized data is known in advance, only the data sequence of the training sequence can be extracted.

Next, the BER estimating portion 4 compares such a data sequence rT(k) of the training sequence 21 or 32 with data of a training sequence (called a reference sequence) held by the receiver side (step S72). A bit having a different value as a result of this comparison is considered to be judged as an error bit in an adaptive equalizing process.

Therefore, the BER estimating portion 4 counts the number of bits being different in these values (step S73), and then divides the number of these different bits obtained by this counting by the number of bits of the training sequence and determines the quotient as an estimated BER value (step S74). And the BER estimating portion 4 outputs this estimated BER value to the update quantity control parameter adjusting portion 5 (step S75).

Figure 2:
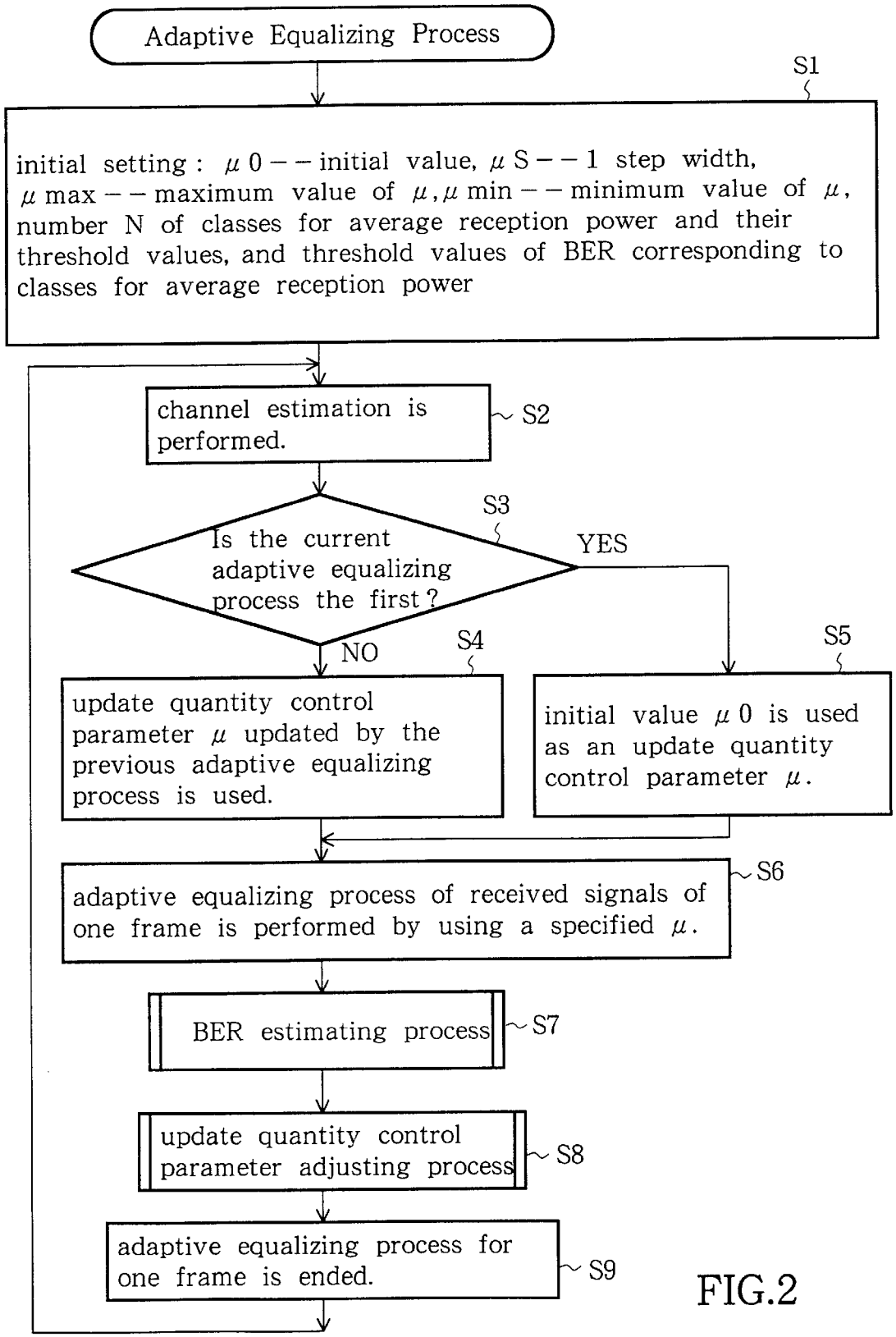
FIG. 2 is a flowchart of an adaptive equalizing process.
Figure 4:
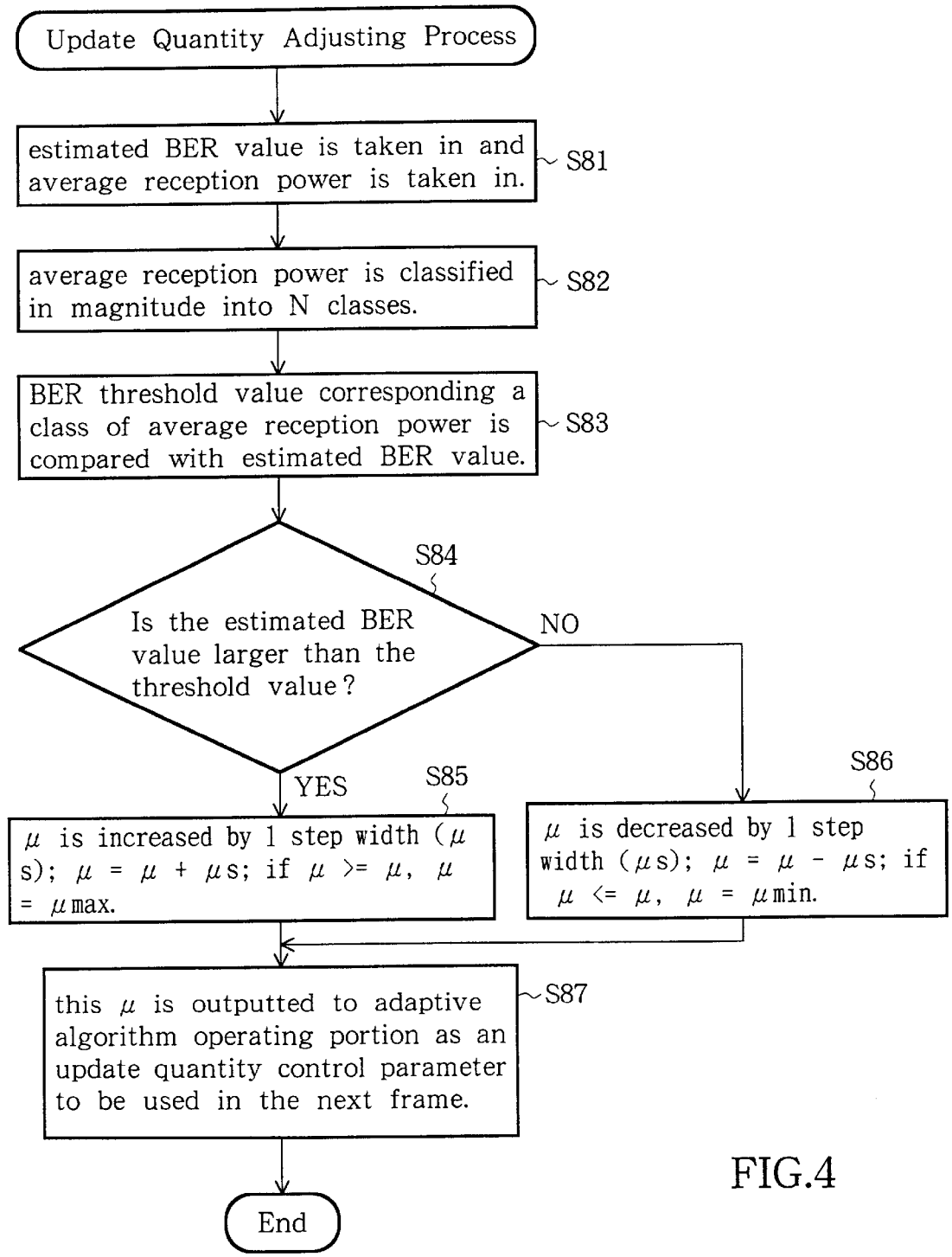
FIG. 4 is a flowchart for explaining operation of an update quantity control parameter adjusting portion.

Next, an update quantity control parameter adjusting process by the update quantity control parameter adjusting portion 5 in step S8 of FIG. 2 is described in more detail with reference to the flowchart of FIG. 4. The update quantity control parameter adjusting portion 5 first takes in an estimated BER value outputted from the BER estimating portion 4, and takes in the average power (average reception power) of received signals over one frame calculated by the average power calculating portion 6 in order to know the average reception electric field being currently processed (step S81).

Figure 8:
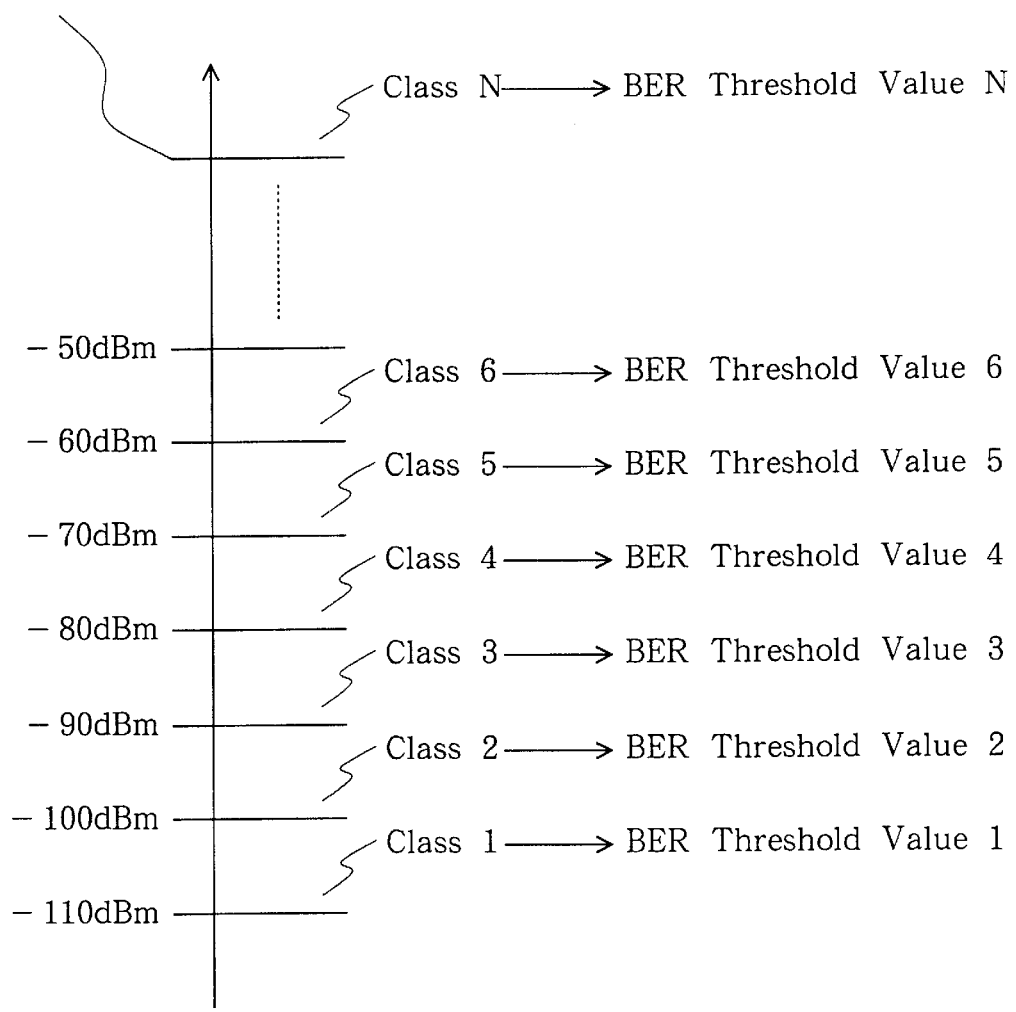
FIG. 8 is an average power classification table.
Figure 9:
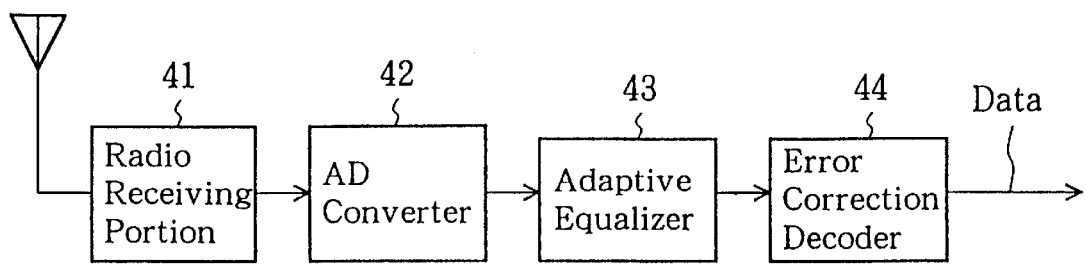
FIG. 9 is a block diagram showing an example of a portable telephone provided with an adaptive equalizer.
Figure 10:
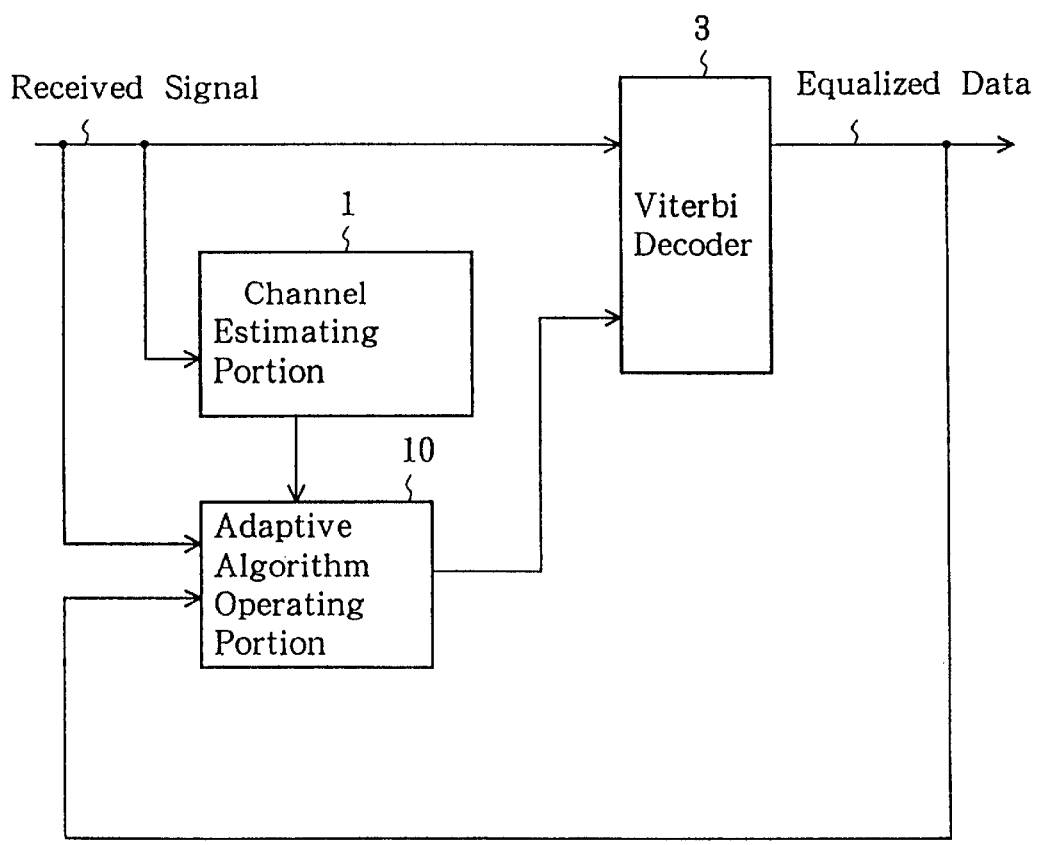
FIG. 10 is a block diagram showing an example of a conventional adaptive equalizer.

Following this, the update quantity control parameter adjusting portion 5 determines what class the average reception power taken in belongs to among N classes into which the average reception power is classified as shown in FIG. 8 (step S82). Since the magnitude of a BER to be expected varies with the strength of a reception electric field even in the same channel state, these classes are set. And a BER threshold value is set in advance for each class of a reception electric field. In FIG. 8, the classes are set in stages of 10 dBm, but the number N of classes representing fineness of this classification may be made larger depending upon conditions of a device.

Then, the update quantity control parameter adjusting portion 5 compares an estimated BER value and the threshold value of BER (set in step S1 of FIG. 2) in a class corresponding to the magnitude of an average reception power determined in step S82 with each other (step S83). That is to say, for example, when an average reception power is −55 dBm, it belongs to class 6 in the example of classification of FIG. 8, and so the threshold value of class 6 and an estimated BER value are compared with each other.

Based on this comparison, the update quantity control parameter adjusting portion 5 determines whether or not the estimated BER value is larger than the threshold value (step S84), and when the estimated BER value is larger, it judges the channel state is bad and increases the update quantity control parameter $\mu$ by one step width $\mu S$, and if the increased parameter value "$\mu+\mu S$" exceeds the maximum value $\mu\mathrm{max}$, it limits the parameter value to the maximum value $\mu\mathrm{max}$ (step S85).

On the other hand, when the estimated BER value is equal to or smaller than the S threshold value of the class, it judges the channel state is good and decreases the update quantity control parameter $\mu$ by one step width $\mu S$, and if the decreased parameter value "$\mu-\mu S$" is equal to or smaller than the minimum value $\mu\mathrm{min}$, it limits the parameter value to the minimum value $\mu\mathrm{min}$ (step S86). The step width $\mu S$, the maximum value $\mu\mathrm{max}$ and the minimum value $\mu\mathrm{min}$ in the steps S85 and S86 have been initially set in step S1 of FIG. 2. The reason why an update quantity control parameter $\mu$ which has been updated is limited up to the maximum value $\mu\mathrm{max}$ and down to the minimum value $\mu\mathrm{min}$ is that an adaptive equalizing process is performed within a normal and proper range corresponding to a system which the invention is to be applied to.

And the update quantity control parameter adjusting portion 5 outputs the update quantity control parameter $\mu$ updated in the step S85 or S86 to the adaptive algorithm operating portion 2 so as to be used in the next frame (step S87).

Thus, this embodiment controls an update quantity control parameter $\mu$ according to an estimated BER value by the BER estimating process and the update quantity control parameter adjusting process, and controls the update quantity control parameter $\mu$ so as to follow variation of a channel state in an environment where the channel state is bad and severely varies by increasing the parameter $\mu$ and thereby reduces deterioration in BER characteristic as shown in FIG. 6. On the other hand, in a good environment where the channel state varies little, by making small the update quantity control parameter $\mu$, as shown in FIG. 5, it reduces deterioration in BER characteristic which could have been caused by a fact that the value of an update quantity control parameter $\mu$ is not optimized adaptively to variation of a channel state.

As described above, since the present invention adjusts and supplies an update quantity control parameter to the adaptive algorithm operating portion on the basis of an estimated bit error rate value and thereby estimates a channel state on the basis of the estimated bit error rate value and optimizes the update quantity control parameter $\mu$ adaptively to variation of the channel state, it can control the update quantity control parameter $\mu$ so as to follow variation of a channel state in an environment where the channel state is bad and severely varies by increasing the parameter $\mu$ which controls the degree of updating a result of channel estimation performed by the adaptive algorithm, and can control the parameter $\mu$ so as to be small in a good environment where the channel state varies little, and thereby can reduce deterioration in bit error rate (BER) characteristic which could have been caused by a fact that the value of an update quantity control parameter $\mu$ is not optimized adaptively to variation of a channel state.

Since the present invention classifies the average power of received signals in magnitude into plural classes, set a threshold value for each of the classes, compares the threshold value and an estimated bit error rate in magnitude with each other and increases or decreases an update quantity control parameter according to a result of the comparison, and thereby adjusts the update quantity control parameter adaptively to an expected bit error rate value varying with the strength of a reception electric field even in the same channel state, it can perform a fine and optimal equalizing process onto a received signal.

What is claimed is:

1. An adaptive equalizer comprising;
    a channel estimating means for having a received signal inputted and estimating the impulse response of a channel of said received signal,
    an adaptive algorithm operating means for adaptively updating the impulse response of the channel estimated by said channel estimating means to a magnitude according to an update quantity control parameter on the basis of an adaptive algorithm,
    a decoding means for performing a Viterbi decoding process on the basis of said received signal and the impulse response of the channel obtained by said adaptive algorithm operating means, and outputting an equalized data signal of said received signal,
    a bit error rate estimating means for estimating the bit error rate of the equalized data taken out from said decoding means, and
    an update quantity control parameter adjusting means for adjusting and supplying said update quantity control parameter to said adaptive algorithm operating means on the basis of the estimated bit error rate value calculated by said bit error rate estimating means.

2. An adaptive equalizer according to claim 1, further comprising an average power calculating means for calculating the average power of said received signals, wherein said update quantity control parameter adjusting means determines what class an average power calculated by said average power calculating means belongs to among plural predetermined classes, compares in magnitude a threshold value set correspondingly to a class determined here and an estimated bit error rate value calculated by said bit error rate estimating means with each other, and updates said update quantity control parameter so that it increases or decreases according to a result of said comparison.

3. An adaptive equalizer according to claim 2, wherein said update quantity control parameter adjusting means updates said update quantity control parameter so that it increases by one step width initially set when an estimated bit error rate value calculated by said bit error rate estimating means is larger than said threshold value, and updates said update quantity control parameter so that it decreases by said one step width initially set when said estimated bit error rate value calculated by said bit error rate estimating means is equal to or smaller than said threshold value.

4. An adaptive equalizer according to claim 1, wherein said bit error rate estimating means takes out data corresponding to a training sequence out of said equalized data taken out from said decoding means, compares the data with a predetermined reference sequence, counts the number of bits being different in value from each other, and determines a value obtained by dividing this number of different bits by the number of bits of the data corresponding to said training sequence as said estimated bit error rate value.

5. An adaptive equalizer according to claim 1, wherein said update quantity control parameter adjusting means limits the upper limit of a value obtained by updating said update quantity control parameter so that it increases to a predetermined maximum value, and limits the lower limit of a value obtained by updating said update quantity control parameter so that it decreases to a predetermined minimum value.

6. An adaptive equalizer according to claim 2, wherein said update quantity control parameter adjusting means sets the number of said plural classes to be compared with the magnitude of the average power calculated by said average power calculating means as a number adapted to conditions of a device.

* * * * *